United States Patent [19]

Riechmann

[11] 4,247,889

[45] Jan. 27, 1981

[54] HIGH-VOLTAGE-SECONDARY TRANSFORMER, PARTICULARLY TELEVISION LINE TRANSFORMER

[75] Inventor: Werner Riechmann, Sibbesse, Fed. Rep. of Germany

[73] Assignee: Blaupunkt-Werke GmbH, Hildesheim, Fed. Rep. of Germany

[21] Appl. No.: 14,473

[22] Filed: Feb. 23, 1979

[51] Int. Cl.[3] .......................... H04N 3/18; H02M 7/10

[52] U.S. Cl. .................................... 363/126; 315/411; 336/185

[58] Field of Search ........................ 315/409, 410, 411; 336/136, 170, 185, 198, 208; 363/125, 126; 323/44 R, 48

[56] References Cited

U.S. PATENT DOCUMENTS

| | | | |
|---|---|---|---|
| 3,562,623 | 2/1971 | Farnsworth | 363/20 |
| 3,573,694 | 4/1971 | Fange et al. | 336/198 |
| 3,843,903 | 10/1974 | Miyoshi et al. | 315/411 X |
| 3,886,434 | 5/1975 | Schreiner | 315/411 X |
| 3,904,928 | 9/1975 | Sawada et al. | 315/410 |
| 3,936,719 | 2/1976 | Miyoshi et al. | 315/411 X |
| 3,947,749 | 3/1976 | Kimura et al. | 363/126 |
| 4,039,924 | 8/1977 | Scales et al. | 315/411 X |
| 4,066,955 | 1/1978 | Suthers | 336/185 X |
| 4,112,337 | 9/1978 | Nagasaki et al. | 315/411 |

FOREIGN PATENT DOCUMENTS

| | | |
|---|---|---|
| 2351130 | 12/1975 | Fed. Rep. of Germany . |
| 2504355 | 11/1978 | Fed. Rep. of Germany . |

*Primary Examiner*—A. D. Pellinen

*Attorney, Agent, or Firm*—Frishauf, Holtz, Goodman & Woodward

[57] ABSTRACT

To decrease the internal resistance of a transformer operable as a television line transformer of the "diode-split" type, the secondary winding sections are matched to each other and to the frequency of operation of the transformer in such a manner that the current in the respective sections will flow at respectively different instants of time; in a preferred form, the winding sections, on the average, are tuned to a harmonic of the frequency of the signal applied to the primary and are positioned on winding forms or holders such that the distance between the bottom wall of the primary and the bottom wall of the secondary is constant over the entire length of the windings. Preferably, the tuning of the respective winding sections is effected by matching of the primary winding to the secondary within the region of the secondary winding sections.

7 Claims, 2 Drawing Figures

HIGH-VOLTAGE-SECONDARY TRANSFORMER, PARTICULARLY TELEVISION LINE TRANSFORMER

Figure 1:
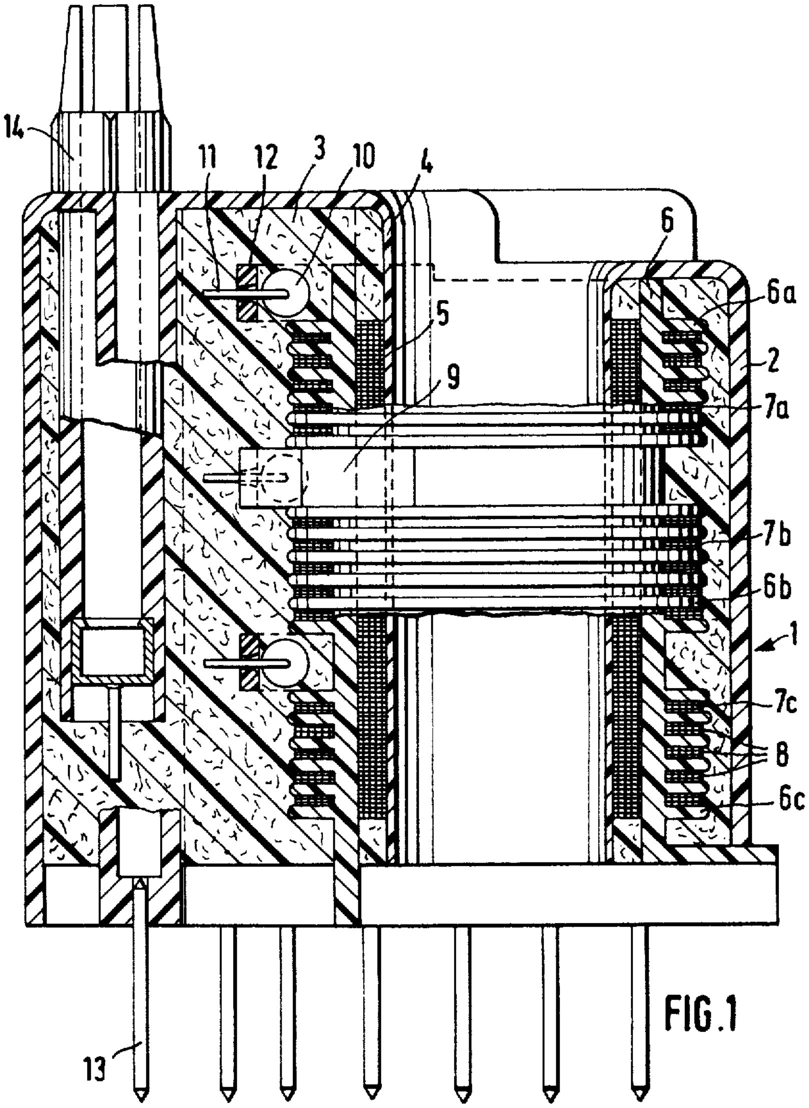

The present invention relates to a transformer providing a high-voltage secondary output, and particularly to a television line transformer having a secondary winding which is subdivided into winding sections or portions interconnected by rectifiers.

BACKGROUND AND PRIOR ART

Television line transformers frequently have divided secondaries, that is, secondaries which are subdivided into sections, connected by rectifier diodes. These transformers, particularly when used as line transformers in TV apparatus, are supplied at the primary with signals of line frequency, and then provide the anode voltage for the TV electron gun, image tube at the secondary. Line transformers in which the secondaries are subdivided and connected by diodes are referred to as "diode-split" transformers. The voltages induced in the partial secondary windings or winding sections add in the form of a voltage doubler or voltage multiplier until the desired high voltage is reached. The stray or leakage capacitances within the transformer and particularly the stray capacitances of the partial windings with respect to a reference voltage act as intermediate storage capacities for the portions of the voltages which are being added.

Transformers of this type have a disadvantage in that they have poor regulation. As a voltage source, they have a comparatively high inherent or internal resistance. Changes in loading which may occur thus lead to changes in output voltage. Applied to a TV system, instability of the format of the resulting image may occur. Changes in loading often are the consequence of changes in beam current.

THE INVENTION

It is an object to provide a transformer, particularly suitable as a line transformer, which has a suitable low internal resistance so that the output power obtained therefrom will be at a voltage which is essentially constant and independent of variations in loading experienced in ordinary television sets, without the necessity of complex circuitry.

Briefly, a transformer of the diode-split type is so constructed that the secondary winding sections are matched to each other and to the frequency of operation of the transformer that the current in the respective section flows at respectively differently instants of time. In a preferred form, the winding sections, on the average, are tuned to a harmonic of the frequency of the signals applied to the primary. Tuning of the various winding sections can be effected by matching the configuration or winding arrangement or number of turns of the respective sections to the primary within the range of the inductive coupling between the primary and the particular section of the secondary. In accordance with a preferred feature, the primary is located within the secondary, and the distance between the inner winding portion of the coil of the primary and the inner winding portion of the coil forming the secondary is essentially constant over the entire width of the windings.

Transformers of this type often are associated with external circuitry, and particularly with a resistor which is connected to a specific secondary section and on which the focussing voltage for the TV image tube can be taken off. In accordance with a feature of the invention, the housing for the transformer is formed with a lateral chamber, remote from the transformer windings themselves and separated therefrom by an air gap. The transformer windings, as well as the chamber for a resistor from which the tapping voltage can be taken off, is filled with a potting compound. This resistor, also referred to as a bleeder resistor, can be applied by thin film or hybrid technology on a small ceramic plate and, by the specific location, is removed from the field generated by the transformer and thus provides a stable output voltage.

The transformer construction in accordance with the present invention, when used as a line transformer in a TV set provides for a more stable picture since it has substantially improved regulation with respect to prior art transformers by having an inherent or inner resistance which is less than that of previously used units. Tuning of the sections of the secondary winding is simple by matching the configuration of the primary winding to the configuration of the secondary sections, which is easier to accomplish in manufacture than if the secondary is matched to the primary.

Figure 2:
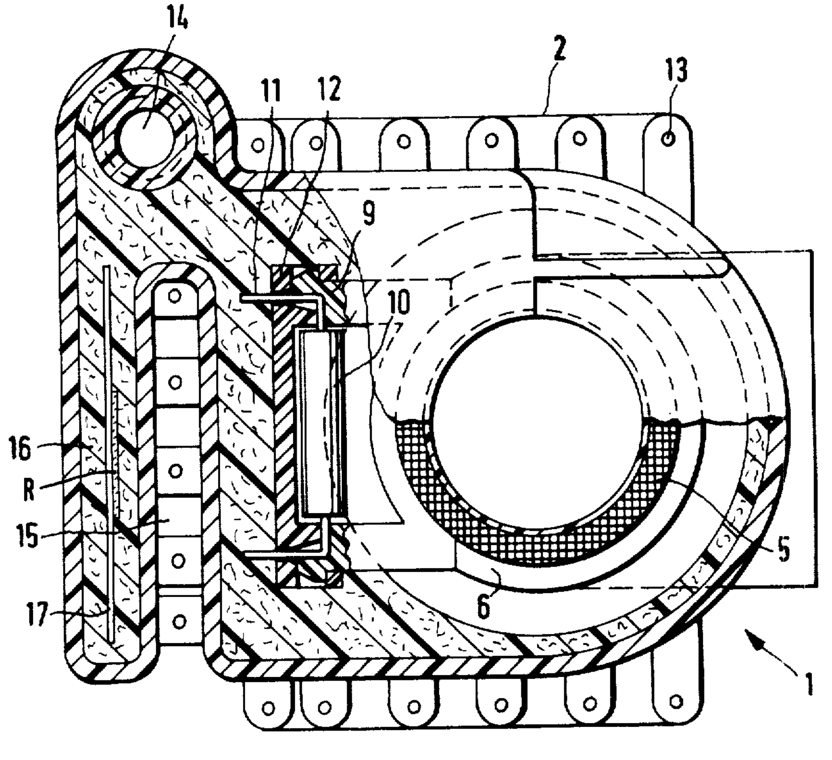

Drawings, illustrating an example, wherein:

FIG. 1 is a side view, partially in section, of a line transformer for television use, having rectifier diodes located within the transformer and connected between individual winding sections; and FIG. 2 is a top view, with part of the housing cut away and in section, of the transformer of FIG. 1.

The transformer is a "diode-split" transformer, the principle of which is known. The transformer 1 is located within a plastic, typically injection-molded plastic, housing 2 which receives a potting compound 3 after the transformer is assembled within the housing. In FIG. 1, the front wall of the housing has been removed. The housing 2 receives, or inherently forms, a coil form 4 for the primary winding 5 of the transformer. The coil form 4 may be part of the housing structure, that is, molded integrally therewith, the coil 5 being wound initially as a coreless or formless structure so that it can be slipped directly over the form 4 which, as best seen from FIG. 2, is essentially a cylinder open at one end. A different type of housing can be used, however, in which the coil form 4 does not form an intergral, molded part, but rather is inserted as a separate form or winding body for the primary.

A coil carrier 6 is located on the primary 5 to receive the secondary of the transformer 1. In accordance with a feature of the invention, the secondary winding is wound in three sections *7a, 7b, 7c,* which subdivide the secondary. The secondary winding sections *7a, 7b, 7c* are each located in three winding chambers *6a, 6b, 6c* of the form 6. The winding chambers *6a, 6b, 6c* each have five winding grooves 8 in which the winding sections *7a, 7b, 7c* each are uniformly distributed. These winding grooves 8 may, however, be non-uniformly distributed if it is desired to effect matching of the tuning of the winding sections to the primary by this distribution; in a preferred form, however, the distribution of the grooves 8 is uniform. The result of this subdivision of the windings into sections *7a, 7b, 7c,* physically separated, i.e. axially spaced from each other (see FIG. 1), is a consequent division of capacity and inductance of the secondary into respectively, individually positioned individual capacity and inductance values and mutual capacity and inductance values of the sections, resulting in different phasing of the current flow, i.e. current flow in the respective sections at respectively different instants of time.

Holders 9 are located above each one of the winding chambers 6a, 6b, 6c, as best seen in FIG. 2, preferably formed integrally with the winding holder or body 6. The holders 9 receive the diodes 10. The diodes 10 are located in the holders 9 with externally bent connecting wires 11. The connecting wires extend through openings or passages of caps 12 snapped over the holders 9, thus securing the diodes 10 on the holders 9. The low-voltage connection of the transformer 1 is effected by connecting pins 13; some of the pins 13, shown in FIG. 1, may be left unconnected and serve as positioning elements. The high-voltage load is connected by a high-voltage cable—not shown—to a connecting bushing 14 located at the side opposite the low-voltage terminals 13.

The housing is formed with a separately arranged chamber 16, separated from the remainder of the transformer by an air gap 15. A ceramic plate 17 on which a resistor R, applied by hybrid technology is located, is positioned in the chamber 16. Thus resistor, forming a bleeder resistor, can be used to generate the focussing voltage for the image tube of the TV set for which the transformer is particularly suitable by connection to a tap point on one of the winding sections *7a, 7b, 7c*, by a suitable connection, not shown for simplicity.

The average tuning frequency of the winding sections *7a, 7b, 7c* is tuned to a harmonic of the frequency of the signal applied to the primary. The respective winding sections *7a, 7b, 7c* are tuned by matching the primary winding to the secondary in the region of inductive coupling of the primary to the respective section of the secondary. The inner diameter of the form 4 for the primary winding and the inner diameter of the secondary winding form or holder 6 are concentric and equidistant throughout at least the length of one of the winding sections, and preferably uniform throughout their entire length.

The transformer will form a voltage source of low internal resistance and thus can be used without additional circuitry or without increasing the size of the transformer. Miniaturization of the transformer is thus possible which is particularly important in modern television equipment.

Making the inner wall of the primary winding and the inner wall of the secondary winding in such a manner that the distances between these two walls are uniform reduces the overall size and substantially simplifies manufacture of the tuned winding sections. It was previously thought necessary to tune the winding sections with respect to each other by varying the thickness of the windings or the distances of the inner limits of the windings with respect to each other. In the transformer as described, this is not necessary and, rather, the inner wall of the transformer primary and the inner wall of the transformer secondary winding sections is uniform which results in a structure in which the comparatively complex secondary winding sections can be made identical to each other, since tuning or matching of the output is obtained by matching the secondary and primary by the shape of the primary winding. The primary winding is matched to the secondary by different magnetic coupling of the primary with respect to the sections of the secondary, that is, with a coupling which differs between the sections of the secondary; and by respectively different stray capacitances between the sections of the secondary and the primary winding, that is, by so arranging the coils that the stray capacitances of any one of the sections *7a, 7b, 7c* of the secondary with respect to the primary are different.

The potting compound 3 can be filled into the transformer after assembly; the resistor secured to the ceramic plate 17 is connected before potting to a tap of the secondary winding. The resistor, by being located in chamber 16 separated from the housing of the transformer itself, eliminates undesired capacitative losses or stray currents which otherwise occur between the secondary winding of the transformer and the resistor. Such stray currents are a minimum by the separation of the resistor from the remainder of the transformer by the air gap, and its positioning in a separate chamber. This separation effectively eliminates electric stray fields which have a disturbing effect at line frequency, since the focussing voltage is undesirably modulated thereby.

In an operating example, a transformer designed for 625 lines, 50 frames (PAL standard) was wound with a diameter of the bottom 4 of 22.5 mm, having 110 turns of 0.31 mm wire to form the primary; over this form, a secondary with an inner winding diameter for the winding sections *7a, 7b, 7c*, of 24.1 mm was placed; the secondary was composed of 2910 turns of 0.071 mm wire, having each three sections of 5 grooves, interconnected by diodes.

I claim:

1. High-voltage secondary transformer, particularly television line transformer, having a primary winding (5) and a secondary winding (*7a, 7b, 7c*) in which the secondary winding is subdivided into a plurality of windings sections (*7a-7b-7c*), and a plurality of rectifier diodes (10) connecting said secondary winding sections together, wherein, in accordance with the invention, the secondary winding sections (*7a, 7b, 7c*) are physically positioned with respect to the primary winding to form spatially separated winding sections, each having individual inductance and capacity values and with respect to the primary, and each other, said positioning on the primary winding being effected to result in current flow in the respective sections (*7a, 7b, 7c*) of the secondary at respectively different instants of time.

2. Transformer according to claim 1, wherein the secondary winding sections are tuned to a harmonic of the frequency of the signal applied to the primary winding (5).

3. Transformer according to claim 2, wherein the respective winding sections (*7a, 7b, 7c*) of the secondary are tuned to the primary (5) by matching the primary winding to the secondary in the region of the respective secondary winding section.

4. Transformer according to claim 3, wherein the distance between the inner dimension of the primary winding and the inner dimension of the secondary winding is constant throughout the length of a winding section.

5. Transformer according to claim 4, wherein said distance is constant throughout the length of all the winding sections.

6. Transformer according to claim 5, for use as a television high-voltage transformer further comprising a resistor (R) connected to one of the secondary winding sections to provide a bleeder voltage for focussing of an image tube of a television apparatus, comprising a housing being formed with a first portion receiving said primary winding (5) and said secondary winding sections (*7a, 7b, 7c*) and a resistor chamber portion defining a chamber (16) in which said resistor (R) is located, said resistor chamber portion being separated from the portion retaining said windings by an air gap (15).

7. Transformer according to claim 3, for use as a television high-voltage transformer further comprising a resistor (R) connected to one of the secondary winding sections to provide a bleeder voltage for focussing of an image tube of a television apparatus, comprising a housing being formed with a first portion receiving said primary winding (5) and said secondary winding sections (*7a, 7b, 7c*) and a resistor chamber portion defining a chamber (16) in which said resistor (R) is located, said resistor chamber portion being separated from the portion retaining said windings by an air gap (15).

* * * * *